United States Patent
Scherrer et al.

(10) Patent No.: US 7,939,025 B2
(45) Date of Patent: May 10, 2011

(54) GAS DISTRIBUTION PLATE FOR FLUIDIZED-BED OLEFIN POLYMERIZATION REACTORS

(75) Inventors: Paul Keith Scherrer, Johnson City, TN (US); Guy Glen Luneau, North Little Rock, AR (US); Kenneth Alan Dooley, Longview, TX (US); Corey Emonn Shaw, Longview, TX (US); Jeffrey James Vanderbilt, Longview, TX (US); Matthew Howard Scott, Longview, TX (US)

(73) Assignee: Westlake Longview Corp., Houston, TX (US)

( * ) Notice: Subject to any disclaimer, the term of this patent is extended or adjusted under 35 U.S.C. 154(b) by 523 days.

(21) Appl. No.: 11/998,415

(22) Filed: Nov. 30, 2007

(65) Prior Publication Data

US 2008/0226512 A1 Sep. 18, 2008

Related U.S. Application Data

(60) Provisional application No. 60/861,726, filed on Nov. 30, 2006.

(51) Int. Cl.
*B01J 8/18* (2006.01)
*F27B 15/00* (2006.01)
*B01J 19/00* (2006.01)

(52) U.S. Cl. ........................................ 422/143; 422/129

(58) Field of Classification Search .................. 422/143, 422/129; 585/329, 255
See application file for complete search history.

(56) References Cited

U.S. PATENT DOCUMENTS

| | | | |
|---|---|---|---|
| 4,226,830 A | 10/1980 | Davis | |
| 4,306,044 A | 12/1981 | Charsley | |
| 4,326,048 A | 4/1982 | Stevens et al. | |
| 4,547,555 A | 10/1985 | Cook et al. | |
| 4,588,790 A * | 5/1986 | Jenkins et al. | 526/70 |
| 4,589,841 A * | 5/1986 | Bergkvist | 431/170 |
| 4,865,540 A | 9/1989 | Fitzgerald | |
| 4,933,149 A | 6/1990 | Rhee et al. | |
| 5,082,634 A | 1/1992 | Raufast | |
| 5,969,061 A | 10/1999 | Wonders et al. | |
| 6,013,741 A | 1/2000 | Ohtani et al. | |
| 6,117,399 A | 9/2000 | Jorgensen et al. | |
| 6,262,190 B1 | 7/2001 | Joyce | |
| 6,301,546 B1 * | 10/2001 | Weinstein et al. | 702/23 |
| 6,333,292 B1 * | 12/2001 | Gibson et al. | 502/167 |
| 6,359,083 B1 | 3/2002 | Dooley et al. | |
| 6,365,681 B1 | 4/2002 | Hartley et al. | |
| 6,429,269 B1 | 8/2002 | Leaney | |
| 6,627,713 B2 | 9/2003 | Bernier et al. | |
| 6,743,870 B1 | 6/2004 | Haardt | |
| 2002/0099151 A1* | 7/2002 | Takimiya et al. | 526/74 |
| 2005/0113545 A1 | 5/2005 | Dooley et al. | |
| 2005/0267269 A1 | 12/2005 | Hagerty et al. | |
| 2006/0094837 A1 | 6/2006 | Dooley et al. | |

FOREIGN PATENT DOCUMENTS

| | | | |
|---|---|---|---|
| EP | 0233787 A | | 8/1987 |
| EP | 0359444 A | | 3/1990 |
| EP | 0600414 A | | 6/1994 |
| EP | 0832684 A | | 4/1998 |
| GB | 2271727 A | * | 4/1994 |

* cited by examiner

*Primary Examiner* — Walter D Griffin
*Assistant Examiner* — Natasha Young
(74) *Attorney, Agent, or Firm* — Phan Law Group PLLC

(57) ABSTRACT

A gas distribution plate for fluidized-bed, olefin polymerization reactors is provided. In addition to holes for distributing a fluidizing gas, the plate comprises a plurality of hollow projections for introducing a fluid into the fluidized-bed reactor. The hollow projections, which can be tubes or pipes, extend above the plate towards the fluidized bed and serve a number of purposes. The projections can break apart or penetrate fallen polymer agglomerates or sheets. They can be equipped with flow or pressure sensors to detect a decrease in flow rate or an increase in pressure drop across the projections, which is an indicator of the presence and/or size of fallen polymer agglomerates or sheets. The projections can also break apart the agglomerates or sheets into smaller pieces by delivering blasts of fluid directly into the agglomerates or sheets. The projections can also be used to inject a kill agent into the fallen agglomerates or sheets, or collapsed portions of the bed, to speed up penetration of the kill agent into the agglomerates, sheets, or collapsed portions.

18 Claims, No Drawings

GAS DISTRIBUTION PLATE FOR FLUIDIZED-BED OLEFIN POLYMERIZATION REACTORS

CROSS-REFERENCE TO RELATED APPLICATION

This application claims the benefit of U.S. Provisional Patent Application No. 60/861,726, filed on Nov. 30, 2006; the entire content of which is hereby incorporated by reference.

FIELD OF THE INVENTION

The invention generally relates to a gas distribution plate for fluidized-bed, olefin polymerization reactors. The invention also relates to a fluidized-bed, olefin polymerization reactor comprising the gas distribution plate as well as a method for detecting the presence or size of fallen polymer agglomerates or sheets in a fluidized-bed, olefin polymerization reactor.

BACKGROUND OF THE INVENTION

In fluidized-bed, olefin polymerization reactors, fluidization of the bed is achieved by means of upward flowing gas that also serves to remove some of the heat of reaction. In the "condensed mode" of operation, the fluidizing gas contains a condensable component which increases the cooling capacity available within the reactor. A grid at the bottom of the reactor is used to uniformly distribute the fluidization gas across the reactor cross-section and to prevent solids from entering the gas supply plenum.

This grid is known by various names in the art such as "gas distributing plate," "gas distribution plate," "gas distributor plate," "perforated plate," "gas distribution grid," "gas fluidization grid," and "gas dispersion grid".

Polymer powder in the reactor can sometimes fuse together, which can lead to the formation of polymer sheets on the reactor walls and/or agglomerates (chunks) on the gas distribution grid. Sheets that break off the wall and settle on the grid can be a precursor for the formation of agglomerates on the grid. Blockage of the gas flow through the grid due to the presence of agglomerates adversely affects the hydrodynamics of the fluidized bed, including the partial or total loss of bed fluidization. When fluidization is lost in portions of the bed, the ability to effectively remove the heat from the polymer particles is also lost. This can lead to melting of the polymer and fusing of the polymer particles into additional agglomerates or chunks. Alternatively, conditions in the polymerization reactor may be such that the cohesive forces in the powder are strong enough to fuse individual powder particles into agglomerates, causing local or total defluidization of the bed, loss of the ability to effectively cool the polymer, and in turn lead to the formation of agglomerates or chunks.

It is desirable, therefore, to have a means for detecting the presence and size of agglomerates and to have a means for breaking up any agglomerates or slowing the rate of their growth. If the growth of agglomerates appears to be out of control, a means for rapidly killing the reaction within the agglomerate, defluidized portions of the bed, and the rest of the powder bed would also be desirable.

SUMMARY OF THE INVENTION

The present invention addresses these needs, as well as others that will become apparent, by providing a specially designed fluidized-bed, olefin polymerization gas distribution plate. The plate comprises:

(a) a plurality of holes for distributing a fluidizing gas into a fluidized bed, olefin polymerization reactor; and (b) a plurality of hollow projections for introducing a fluid into the fluidized bed reactor.

In one embodiment, the hollow projections comprise sensors for measuring the flow rate or pressure of the fluid passing through the projections; and have a size and shape, and are made of a material that is effective to break apart or to penetrate fallen polymer agglomerates, sheets, or defluidized portions of the bed.

The present invention also provides for a fluidized-bed, olefin polymerization reactor that comprises the novel gas distribution plate according to the invention.

The present invention further provides for a method for detecting the presence or size of fallen polymer agglomerates or sheets in a fluidized bed, olefin polymerization reactor. The method comprises the steps of:

(a) providing the reactor with a gas distribution plate comprising:
  (i) a plurality of holes for distributing a fluidizing gas into the fluidized bed reactor; and
  (ii) a plurality of hollow projections for introducing a fluid into the fluidized bed reactor, wherein the hollow projections comprise sensors for measuring the flow rate or pressure of the fluid passing through the projections;

(b) measuring the flow rate or pressure of the fluid passing through the projections; and (c) monitoring the flow rate or pressure of the fluid passing through the projections for a decrease in flow rate or for a pressure drop.

DETAILED DESCRIPTION OF THE INVENTION

The present invention involves the use of a plurality of hollow projections that extend above a fluidized-bed, olefin polymerization gas distribution plate located at the bottom of the reactor. As noted above, the plate is used to uniformly distribute the fluidization gas across the reactor cross-section and to prevent solids from entering the gas supply plenum. Typically, the plate can be a screen, a slotted plate, a perforated plate, a plate having holes or ports and angle caps or bubble caps over them, or the like. The preferred type of gas distributor plate is generally fabricated from metal and has a plurality of holes distributed across its surface. The holes are normally about one-half inch in diameter and extend through the thickness of the plate.

The hollow projections can be of various sizes and shapes, but are preferably in the form of pipes or tubes that extend about 4 to 8 inches, such as 6 inches, above the distribution plate, i.e., toward the direction of the fluidized bed. Thus, in the condensed mode of operation, any liquid that condenses on the top of the plate will not influence the flow of fluid through the projections. One preferred shape of the hollow projections is that resembling a spike or spear, so that the hollow projections may serve to break apart or to penetrate fallen polymer agglomerates or sheets.

The material making up the hollow projections is not particularly limiting. The material should be sufficiently durable to withstand the conditions inside the fluidized bed reactor and hard enough to break apart or to penetrate fallen polymer agglomerates or sheets while substantially maintaining its shape. The material can be metal, but is preferred to be made of a plastic so that if it becomes necessary to cut up an agglomerate to facilitate removal, the projections can be easily cut and then replaced at low cost.

The hollow projections may be structures formed as part of the plate or may be added later to preformed plates or retrofitted to existing plates currently in use. In the latter cases, the hollow projections may be reversibly (as opposed to permanently) attached to holes in the plate, such as through the use of adhesives, screws or other fastening device, or screwed to the plate via appropriate threading on the projections and in the holes of the plate. Alternatively, the hollow projections may not be attached to the plate at all, but may simply protrude from the bottom up through openings in the plate.

The number of hollow projections employed can vary over a wide range, such as from 2 to 30 or more. Typically, anywhere from 8 to 16 hollow projections distributed across the area covered by the plate should be suitable.

During normal operation, a fluid, which can be a gas or a volatile liquid under polymerization conditions, is passed through the hollow projections at sufficiently high flow rates to prevent solids from plugging the projections. Such flow rates will depend on the particular system in which the plate is employed. But generally, the flow rates can range from that necessary to insure average velocities of 2 to 200 ft/sec.

The type of fluid passing through the hollow projections can vary, depending on the circumstances of the reactor. During normal operation, the fluid can have the make-up of the fluidizing gas, it can be a diluent such as nitrogen, ethane, propane, or butane, etc., or it be a feed stream containing monomers.

In one particularly preferred embodiment, the hollow projections are equipped with sensors for measuring the flow rate or pressure of the fluid passing through the projections. A decrease in the average flow rate through an individual projection or an increase in the pressure drop across an individual projection will be indicative of agglomerate formation around the outlet of the projection.

Furthermore, if adjacent hollow projections detect a drop in flow or increased pressured drop, the size of the agglomerate can be assessed because the spacing between the projections will be known.

Thus, in another aspect, the invention provides a method for detecting the presence or size of fallen polymer agglomerates or sheets in a fluidized-bed, olefin polymerization reactor. The method comprises:

(a) providing a fluidized-bed, olefin polymerization reactor with a gas distribution plate comprising:
  (i) a plurality of holes for distributing a fluidizing gas into the fluidized bed reactor; and
  (ii) a plurality of hollow projections for introducing a fluid into the fluidized bed reactor, wherein the hollow projections comprise sensors for measuring the flow rate or pressure of the fluid passing through the projections;
(b) measuring the flow rate or pressure of the fluid passing through the projections; and
(c) monitoring the flow rate or pressure of the fluid passing through the projections for a decrease in flow rate or for an increase in pressure drop.

If the size of the agglomerate appears to be too large for the reactor outlet, as indicated by detecting a decrease in flow rate below a set value or an increase in pressure drop above a set value in any of the hollow projections, rapidly increasing the flow rate of the fluid passing through the affected projection(s) may serve to break the agglomerate into manageable pieces. If one or more blasts of fluid through the hollow projections do not break up the agglomerate into manageable pieces, then a suitable kill agent can be injected into the affected projection(s) in an attempt to speed up the penetration of the kill agent into the agglomerate.

The kill agent can be selected from a wide variety of products which are preferably gases or volatile liquids under polymerization conditions and are capable of reducing the polymerization rate of the olefin in the presence of a catalyst based on a transition metal. The kill agent can be a polymerization inhibitor or a poison known for this type of reaction. Such compounds include carbon monoxide, carbon dioxide, carbon disulfide, carbon oxysulfide, nitrogen oxides and peroxides, oxygen, alcohols having 1 to 6 carbon atoms, aldehydes having 1 to 6 carbon atoms, ketones having 1 to 6 carbon atoms, thiols, and water.

The kill agent can also be an electron donor compound capable of complexing the catalyst and reducing the polymerization rate such as organic compounds containing at least one oxygen, sulfur, nitrogen, and/or phosphorus atom. Such compounds include amines, amides, phosphines, sulfoxides, sulfones, esters, ethers, and thioethers.

The preferred kill agent is carbon dioxide because it is capable of retarding polymerization in the system without causing detrimental side effects.

In the event where the use of kill agents is deemed necessary, the injection of liquid kill agents directly into a defluidized portion of the bed such that the liquid would evaporate quickly under polymerization conditions can improve radial dispersion of the kill agent in the defluidized portion of the bed and around the discharge of each hollow projection. The rapid generation of vapor caused by injection of such liquid kill agents can assist in the breakup of the collapsed portion of the fluidized bed.

Further, injection of liquid inert diluents or liquid monomers through the matrix of hollow projections during normal operation can provide cooling in the area where collapsed or partially collapsed beds are likely to occur. The effect would be to slow the growth of agglomerates prior to introduction of the kill agent.

Additionally, depressurization of the reactor while a kill agent is introduced through the affected hollow projection(s) can speed up the delivery of the kill agent into the interstices of the agglomerate (defluidized powder).

As used herein, the term "plurality" means two or more.

As used herein, "a set value" means a value determined beforehand. The set value can be a specific value of the flow rate or pressure drop of the fluid passing through the hollow projections. The set value can also be a percentage, for example, 95%, 90%, 85%, 80%, 75%, 70%, 65%, 60%, 55%, 50%, etc., of the average flow rate or pressure drop of the fluid passing through the hollow projections.

The plate according to the invention can be installed in any of the fluidized-bed reactors known in the art for polymerizing olefins.

In another aspect, the present invention includes the rapid injection of large amounts of liquid kill agents above the gas distribution plate, possibly at a height of 2 to 3 feet above the plate. Liquid densities are greater than the density of the fluidizing medium and the evaporation rate of liquid kill agents at polymerization conditions allows the kill agent to exist in both the gaseous and liquid states for a significant time after injection. This could improve dispersion of the kill agent into collapsed portions of bed by using gravity to assist the liquid penetration as well as by providing a kill agent that would vaporize once it penetrates a collapsed portion of a fluidized bed. Also kill agent on the powder being circulated provides additional circulation of the kill agent in the portions of the bed that remain fluidized. Such a process might utilize large amounts of water dispersed across the entire cross-sectional area of the polymerization vessel.

Additionally, pressurization of the reactor after a kill agent is introduced would speed delivery of the kill agent into the interstices of the agglomerate (defluidized powder).

The invention has been described in detail with particular reference to preferred embodiments thereof, but it will be understood that variations and modifications can be effected within the spirit and scope of the invention.

We claim:

1. A method for detecting the presence or size of fallen polymer agglomerates or sheets in a fluidized bed, olefin polymerization reactor, comprising:

(a) providing said reactor with a gas distribution plate comprising:

(i) a plurality of holes for distributing a fluidizing gas into the fluidized bed reactor; and (ii) a plurality of hollow projections for introducing a fluid into the fluidized bed reactor, wherein said hollow projections comprise sensors for measuring the flow rate or pressure of the fluid passing through the projections;

(b) measuring the flow rate or pressure of the fluid passing through the projections; and (c) monitoring the flow rate or pressure of the fluid passing through the projections for a decrease in flow rate or for an increase in pressure drop.

2. The method according to claim 1, wherein said hollow projections are tubes or pipes.

3. The method according to claim 2, wherein said hollow projections have a size and shape, and are made of a material effective to break apart or to penetrate the fallen polymer agglomerates or sheets.

4. The method according to claim 2, wherein said hollow projections are de-attachable from the plate.

5. The method according to claim 2, wherein said hollow projections protrude through openings in the plate.

6. The method according to claim 2, wherein said hollow projections are replaceable.

7. The method according to claim 6, wherein said hollow projections are made of plastic.

8. The method according to claim 2, wherein the plate comprises 8 to 16 hollow projections.

9. The method according to claim 2, wherein said hollow projections extend about 6 inches above the distribution plate.

10. The method according to claim 2, wherein the fluid passing through the hollow projections is a liquid.

11. The method according to claim 10, wherein the liquid is an inert diluent or an olefin.

12. The method according to claim 2, further comprising increasing the flow rate of the fluid passing through one or more of the hollow projections upon detecting a decrease in flow rate or a pressure drop below a set value in the hollow projections.

13. The method according to claim 12, wherein said fluid is an inert diluent.

14. The method according to claim 13, wherein the inert diluent is nitrogen.

15. The method according to claim 2, further comprising passing a polymerization kill agent through one or more of the hollow projections upon detecting a decrease in flow rate below or an increase in pressure drop above a set value in the hollow projections.

16. The method according to claim 15, wherein the polymerization kill agent is carbon dioxide.

17. The method according to claim 16, wherein the polymerization kill agent is introduced as a liquid.

18. The method according to claim 15, further comprising depressurizing the reactor while the kill agent is being passed through one or more of the hollow projections.

* * * * *